US009858610B2

(12) United States Patent
Goulart

(10) Patent No.: US 9,858,610 B2
(45) Date of Patent: Jan. 2, 2018

(54) PRODUCT RECOMMENDATION BASED ON GEOGRAPHIC LOCATION AND USER ACTIVITIES

(71) Applicant: Wal-Mart Stores, Inc., Bentonville, AR (US)

(72) Inventor: Valerie Goulart, Seattle, WA (US)

(73) Assignee: WAL-MART STORES, INC., Bentonville, AR (US)

(*) Notice: Subject to any disclaimer, the term of this patent is extended or adjusted under 35 U.S.C. 154(b) by 512 days.

(21) Appl. No.: 14/473,004

(22) Filed: Aug. 29, 2014

(65) Prior Publication Data
US 2016/0063597 A1 Mar. 3, 2016

(51) Int. Cl.
*G06Q 30/00* (2012.01)
*G06Q 30/06* (2012.01)
*H04W 4/02* (2009.01)
*G06Q 50/00* (2012.01)

(52) U.S. Cl.
CPC ..... *G06Q 30/0631* (2013.01); *G06Q 30/0639* (2013.01); *G06Q 50/01* (2013.01); *H04W 4/021* (2013.01)

(58) Field of Classification Search
CPC combination set(s) only.
See application file for complete search history.

(56) References Cited

U.S. PATENT DOCUMENTS

| 7,774,002 B1 | 8/2010 | Ortega |
| 7,945,484 B1 | 5/2011 | Tam |
| 8,010,134 B2 | 8/2011 | Barnes |
| 8,046,001 B2 | 10/2011 | Shalmon |
| 8,606,636 B1 * | 12/2013 | Keoshkerian ...... G06Q 30/0252 705/14.5 |
| 8,682,350 B2 | 3/2014 | Altman |
| 2001/0021914 A1 * | 9/2001 | Jacobi .................. G06Q 30/02 705/14.53 |
| 2004/0192351 A1 | 9/2004 | Duncan |
| 2005/0159974 A1 | 7/2005 | Moss |
| 2007/0061302 A1 * | 3/2007 | Ramer ................ G06F 17/3087 |
| 2008/0091722 A1 * | 4/2008 | Wendelrup ........ G06F 17/30867 |
| 2008/0249898 A1 | 10/2008 | Ratnakar |
| 2010/0153008 A1 | 6/2010 | Schwartz |
| 2011/0010245 A1 | 1/2011 | Priebatsch |

(Continued)

FOREIGN PATENT DOCUMENTS

| WO | WO0161671 A1 | 8/2001 |
| WO | WO2011077449 A1 | 6/2011 |
| WO | WO2014084426 A1 | 6/2014 |

OTHER PUBLICATIONS

Context Aware Recommender Systems—Adomavicius, Mobasher, Ricci, Tuzhilin Fall 2011.*

(Continued)

*Primary Examiner* — Courtney L Stopp
(74) *Attorney, Agent, or Firm* — Bryan Cave LLP

(57) ABSTRACT

Example systems and methods for recommendation based on geographic location and user activities are described. In one implementation, a method may receive geographic information associated with a user. The method may also retrieve a circumstance parameter associated with the geographic information and identify one or more items based on the graphic information and the circumstance parameter.

20 Claims, 4 Drawing Sheets

(56) References Cited

U.S. PATENT DOCUMENTS

| | | | |
|---|---|---|---|
| 2011/0040625 A1 | 2/2011 | Woodruff | |
| 2011/0276565 A1* | 11/2011 | Zheng | G01C 21/20 |
| | | | 707/724 |
| 2011/0307478 A1* | 12/2011 | Pinckney | G06N 99/005 |
| | | | 707/724 |
| 2012/0197750 A1* | 8/2012 | Batra | G06F 17/30592 |
| | | | 705/26.7 |
| 2012/0245995 A1 | 9/2012 | Chawla | |
| 2013/0024471 A1* | 1/2013 | Mitrovic | G06F 17/30867 |
| | | | 707/769 |
| 2013/0054698 A1* | 2/2013 | Lee | G06Q 30/0259 |
| | | | 709/204 |
| 2013/0079036 A1 | 3/2013 | Sharet | |
| 2013/0166386 A1 | 6/2013 | Simmons | |
| 2013/0262311 A1* | 10/2013 | Buhrmann | G06Q 20/40 |
| | | | 705/44 |
| 2014/0025670 A1* | 1/2014 | Daran | G06F 17/3053 |
| | | | 707/724 |

OTHER PUBLICATIONS

Tagommenders—Connecting Users to Items through Tags—Sen, Vig, Riedl Apr. 2009.*

* cited by examiner

PRODUCT RECOMMENDATION BASED ON GEOGRAPHIC LOCATION AND USER ACTIVITIES

TECHNICAL FIELD

The present disclosure relates to methods and systems for product recommendation based on geographic location and user activities.

BACKGROUND

Recommender systems have been broadly used in various e-commerce applications such as targeted marketing, advertisement, and personalized search. Despite the widespread application of recommender systems, understanding user activities and therefore predicting user interest are still an open problem for many e-commerce vendors and service providers. For example, current recommender systems focus on building a model from previous behavior of users and use the model to predict products, or items, for recommendation. However, given dynamicity of interest of users in e-commerce, it would be difficult to accurately predict user interest by merely analyzing previous activities of the users.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
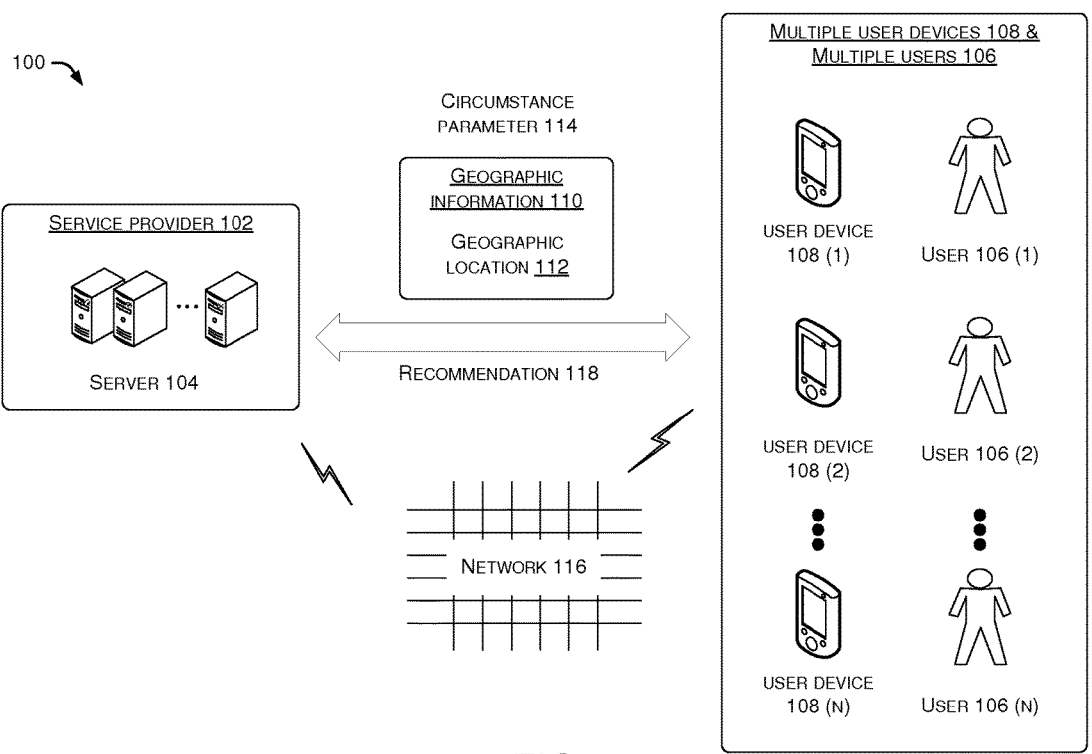
FIG. 1 is a block diagram depicting a computing environment within which an example embodiment of the present disclosure may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The articles "a" and "an" are used herein to refer to one or to more than one (i.e. to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Embodiments of the present disclosure utilize a user's mobile device, IP address and/or other suitable means to capture her location and then suggest relevant items to the user. The recommended items may be dynamically selected and presented to the user based on relevant and real-time information associated with the current geographic location of the user as well as current events, local weather of the current location of the user, season of the year, time of the day, etc. The relevant and real-time information may include the current location of the user and other information such as, for example, a local time as well as weather associated with the current location. In some embodiments, by targeting specialty stores, stadiums and other locations, assumptions may be made about the user's shopping preferences. For example, if a user frequently visits AT&T Park in San Francisco, Calif., then baseball caps, shirts, and other memorabilia associated with the baseball team San Francisco Giants may be presented as recommendation to the user, e.g., via a mobile app associated with a service provider or on a web browser. As another example, if the user spends certain amount of time at Babies-r-Us® or BuyBuy Baby®, items in a baby category may be presented to the user, e.g., via the mobile app or on a web browser.

FIG. 1 is a block diagram depicting a computing environment 100 within which an example embodiment of the present disclosure may be implemented. Computing environment 100 includes a service provider 102 associated with a server 104. Service provider 102 may provide a service related to item recommendation for one or more users of multiple users 106(1)-106(N) via multiple user devices 108(1)-108(N). For example, the service may include a set of related software and/or hardware functionalities that may be reused for different purposes, together with the policies that, for example, recommend one or more items to a user (e.g., a user 106(1)) based on information of multiple users 106(1)-106(N).

In some embodiments, server 104 may generate a user profile for an individual user (e.g., user 106(1)) of multiple users 106(1)-106(N). The user profile may include a collection of records of user information (e.g., user demographic information) and behavior (e.g., user activities) that are, for example, associated with one or more items. The user demographic information may include user information related to gender, age, ethnicity, knowledge of languages, disabilities, mobility, home ownership, employment status, living/working location, etc. The user activities may include user interaction with service provider 102, for example. In some embodiments, an individual user activity of a user may be monitored to generate a user activity history. The user profile may be obtained from store receipts, credit card purchases, mail order requests, information inquiries, browsers, cookies, and other sources related to customer preferences or predisposition associated with the one or more items. In some embodiments, the user profile may include user preference data, which may be maintained by service provider 102 in a user profile database. In some embodiments, the user profile database may include a history of user preferences of multiple users 106(1)-106(N) who interacted with service provider 102 within a predetermined period of time or in a real-time manner.

In some embodiments, the user preference data may include choices that user 106(1) has made with respect to the user's interests (e.g., highly likes, partially likes, dislikes, etc.). For example, the user preference data may include implicit and/or explicit information about user 106(1), the extent to which user 106(1) likes or dislikes one or more items. The implicit and/or explicit information may be extracted from one or more interactions of user 106(1) with service provider 102 or other service providers. In some embodiments, explicit information may be in the form of ratings associated with one or more particular items, and implicit information may be generated by interpreting the user interaction data. For example, an online retailer website may infer that user 106(1) likes a product if she stays with the item page more than a predetermined period of time. In some embodiments, the profile database may contain a collection of organized user preference data for multiple users 106(1)-106(N).

In some embodiments, the user profile may include geographic information 110 of, for example, some or all of multiple users 106(1)-106(N). Geographic information 110 may include user information and behavior that are relate to geographic location 112 of some or all of multiple users 106(1)-106(N). Geographic location 112 may indicate a relative location (e.g., Seattle or 1313 Disneyland Dr, Anaheim, Calif. 92802, etc.) as a displacement for a site or an absolute location using a coordinate system (e.g., a spherical coordinate system or a world geodetic system). Geographic information 110 may be associated with a circumstance parameter 114. In some embodiments, circumstance parameter 114 may include a reference of geographic location 112, weather of geographic location 112 (e.g., rain, cloudy, etc.), a local social event of geographic location 112 (e.g., basketball game, football game, etc.), a trending topic associated with geographic location 112, geographic relatedness of geographic location 112, activity information associated with geographic location 112, and/or patterns of geographic behavior that are associated with multiple users 106(1)-106N).

In some embodiments, server 104 may collect geographic information 110 of multiple users 106(1)-106(N) from multiple user devices 108(1)-108(N) via a network 116. Network 116 enables server 104 to exchange information with multiple user devices 108(1)-108(N). Network 116 may include wired and/or wireless networks that enable communications between the various computing devices described in environment 100. In some embodiments, network 116 may include local area networks (LANs), wide area networks (WAN), mobile telephone networks (MTNs), and other types of networks, possibly used in conjunction with one another, to facilitate communication between the various computing devices (e.g., server 104, user device 108(1), etc.). Multiple user devices 108(1)-108(N) may be a mobile or desktop computer, a personal data assistant (PDA), an internet appliance, an internet enabled mobile phone, a server or any other computing device configured with a network connection.

After receiving geographic information 110, server 104 may analyze geographic information 110, identify one or more items based on the geographic information 110 and circumstance parameter 114, and provide a recommendation 118 including the one or more items to, for example, user 106(1).

Under the current technologies, mobile marketing is performed across the country while ignoring regional differences in locations and weather. For example, parts of California may have 65-degree sunny days while Minnesota may be buried in 10 feet of snow. By paying attention to the location of multiple users 106(1)-106(N), service provider 102 may recommend more relevant items to the multiple users 106(1)-106(N). As another example, service provider 102 may have a marketing campaign on the day of 2014 Super Bowl game. For users who are not interested in the Super Bowl, the marketing campaign may not be useful for those users. For example, the marketing campaign may be adjusted to focusing on Seattle and Denver, and may recommend pertinent memorabilia to users in those two cities.

In some embodiments, user 106(1) may not shop via service provider 102. Using geographic information 110, service provider 102 may determine, for example, that user 106(1) visited two tire shops and a physical store associated with another service provider. Service provider 102 may assume that user 106(1) intends to buy tires, and therefore provide a tire recommendation and/or promotion related to tires via a mobile app maintained by, for example, the other service provider 102, where the mobile app is installed and executed on user device 108(1) which is associated with and used by user 106(1).

Figure 2:
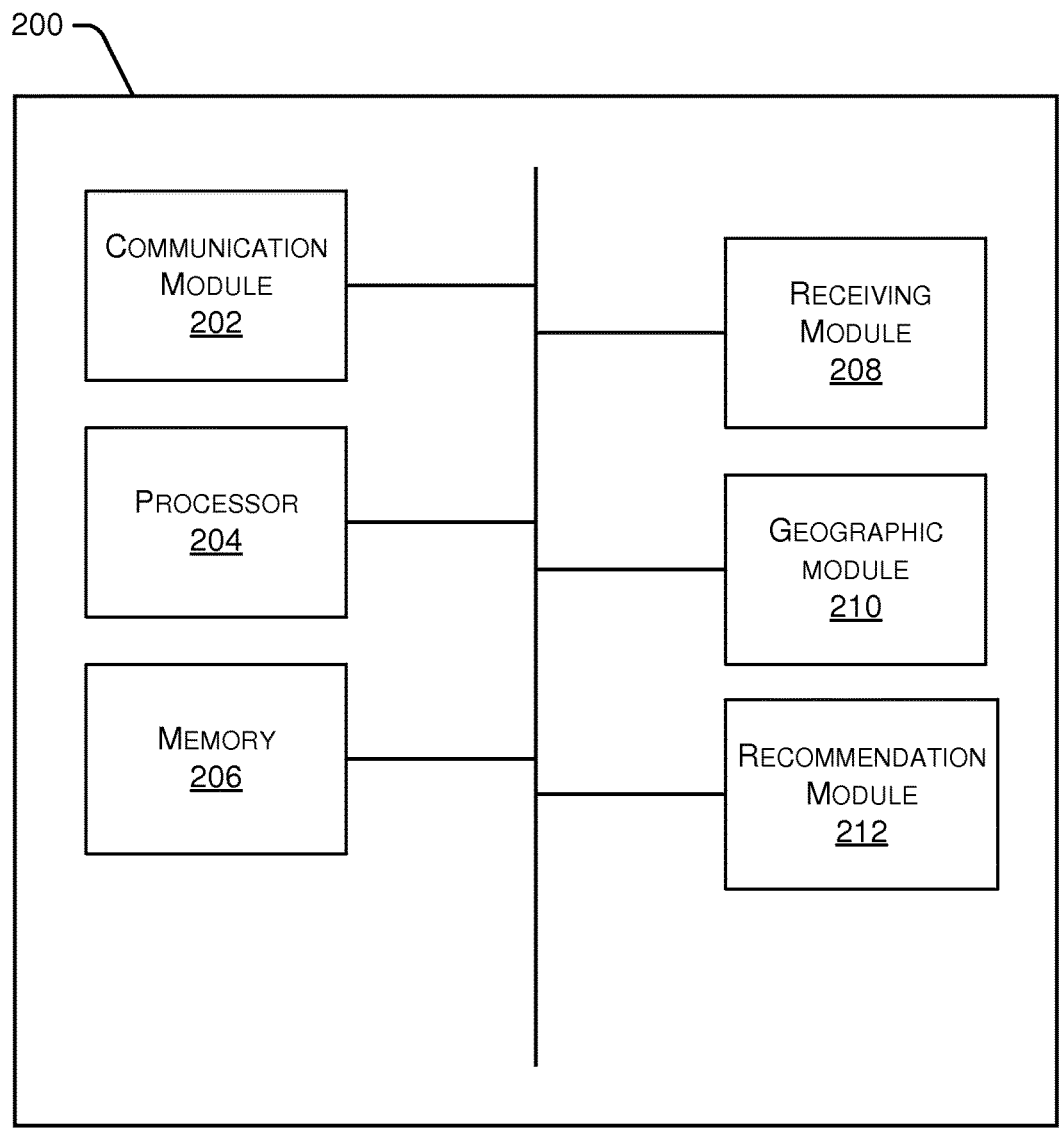
FIG. 2 is a block diagram depicting an embodiment of a computing device configured to implement systems and methods of the present disclosure.

FIG. 2 is a block diagram depicting an embodiment of a computing device 200 configured to implement systems and methods of the present disclosure. Computing device 200 (e.g., server 104) performs various functions related to recommending items based on geographic information and user activities, as discussed herein. In some embodiments, computing device 200 may be implemented as one or more computing devices that cooperatively implement the functions described herein. Computing device 200 may include a communication module 202, one or more processors (shown as a processor 204 in FIG. 2), and a memory 206. Communication module 202 allows computing device 200 to communicate with other systems, such as communication networks, other servers, etc. Processor 204 executes one or more sets of instructions to implement the functionality provided by computing device 200. Memory 206 stores those instructions executable by processor 204 as well as other data used by processor 204 and other modules contained in computing device 200, such as a receiving module 208, a geographic module 210, a recommendation module 212, etc.

Computing device 200 may also include receiving module 208 which is configured to receive geographic information 110 associated with a user, e.g., user 106(1). For example, geographic information 110 may determine and indicate geographic location 112 of user 106(1), which may be represented by Global Positioning System (GPS) coordinates, location of a computing device (e.g., as user device 108(1)) by triangulation of wireless communication signals with multiple cellular towers, or a street address associated with user 106(1).

Computing device 200 may also include geographic module 210 which is configured to retrieve circumstance parameter 114 associated with geographic location 112. Circumstance parameter 114 may include at least one of weather information associated with geographic location 112 in a predetermined period of time, a local social event associated with geographic location 112, a trending topic associated with geographic location 112, or activity information associated geographic location 112. The activity information may indicate an area for a certain activity, for example, shopping, reading, watching, driving, working, entertaining, etc. For example, the area may include a physical store, a cinema, the home of user 106(1), a scenic spot, etc.

In some embodiments, computing device 200 may monitor and/or analyze social media related to geographic information 110 to retrieve information associated with the local community event. The local community event may include a certain event that a community associated with geographic location 112 is interested in within a predetermined period of time. For example, the Super Bowl XLVIII may be a local community event for Seattle and/or the State of Washington during the month of February of 2014.

In some embodiments, computing device 200 may monitor and/or analyze social media related to geographic information 110 to retrieve information associated with the trending topic. The trending topic may include a hot topic of social media or a topic that is moving or rising into the news at a certain period of time. The trending topic may be selected based on, for example, an amount of volume in the social media that is related at least to: geographic location 112, the user profile of user 106(1), and the local community events associated with geographic location 112. In some embodiments, the trending topics may include a topic having an intensity rate of exchange within the social media more than a predetermined threshold value. For example, geographic module 210 may select the trending topic based on an amount of instances of the trending topic in social media associated with geographic location 112 or an intensity rate of exchange of the trending topic in the social media associated with geographic location 112.

The social media may include social interaction among people in which they create, share or exchange information and ideas in virtual communities and networks. For example, the social media may include social interaction from at least one of collaborative projects (e.g., Wikipedia®), blogs and microblogs (e.g., Twitter® and Tumblr®), content communities (e.g., YouTube® and Youku®), social networking sites (e.g., Facebook®, Wechat®), virtual game-worlds, or virtual social worlds. Social media technologies take on many different forms including magazines, Internet forums, weblogs, social blogs, microblogging, wikis, social networks, podcasts, photographs or pictures, video, rating and social bookmarking.

In some embodiments, circumstance parameter 114 may include a frequency or duration of visits to geographic location 112 by user 106(1), and/or geographic relatedness that may indicate a relationship between user 106(1) and geographic location 112. In some embodiments, geographic relatedness may indicate geographic status (e.g., at home, away from home, at office, etc.) associated with geographic location 112.

Computing device 200 may also include recommendation module 212 which is configured to identify one or more items based at least in part on geographic location 112 and circumstance parameter 114, and then provide recommendation 116 associated with the one or more items, e.g., to be presented to user 106(1) on a mobile app of user device 108(1) or on a web browser displayed on user device 108(1). In some embodiments, receiving module 208 may retrieve user preference data associated with multiple users 106(1)-106(N) and the one or more items. In these instances, recommendation module 212 may adjust a list of the one or more items based on the user preference data.

In some embodiments, recommendation module 212 may also determine an appropriate time to present recommendation 116 to the user. For example, if user 106(1) is an Asda® online grocery shopper using her Asda® mobile app, showing frozen breakfast sandwiches at 2 p.m. may not be as appealing as showing snack foods. In addition, a time of day, a day of the week and/or a season may also be taken into account. For example, if most of multiple users 106(1)-106 (N) add milk to shopping carts during online shopping processes on Wednesday mornings, service provider 102 may promote milk and/or items associated with milk (e.g., cereals) on Wednesday mornings.

In some embodiments, geographic module 210 may analyze a user activity history of user 106(1) to generate a pattern of behavior associated with user 106(1), and determine an additional user (e.g., user 106(2)) having a similar pattern of behavior in a predetermine period of time. The pattern of behavior associated with user 106(1) may include customized views and/or reports of user-related activities of user 106(1) for an item recommendation. The user-related activities may include, for example, user data changes of geographic information 110 and circumstance parameter 114 in a predetermined period of time. In some instances, recommendation module 212 may also identify a particular item of the one or more items that is purchased by user 106(2), and increase a rank of the particular item in the recommendation 118.

Figure 3:
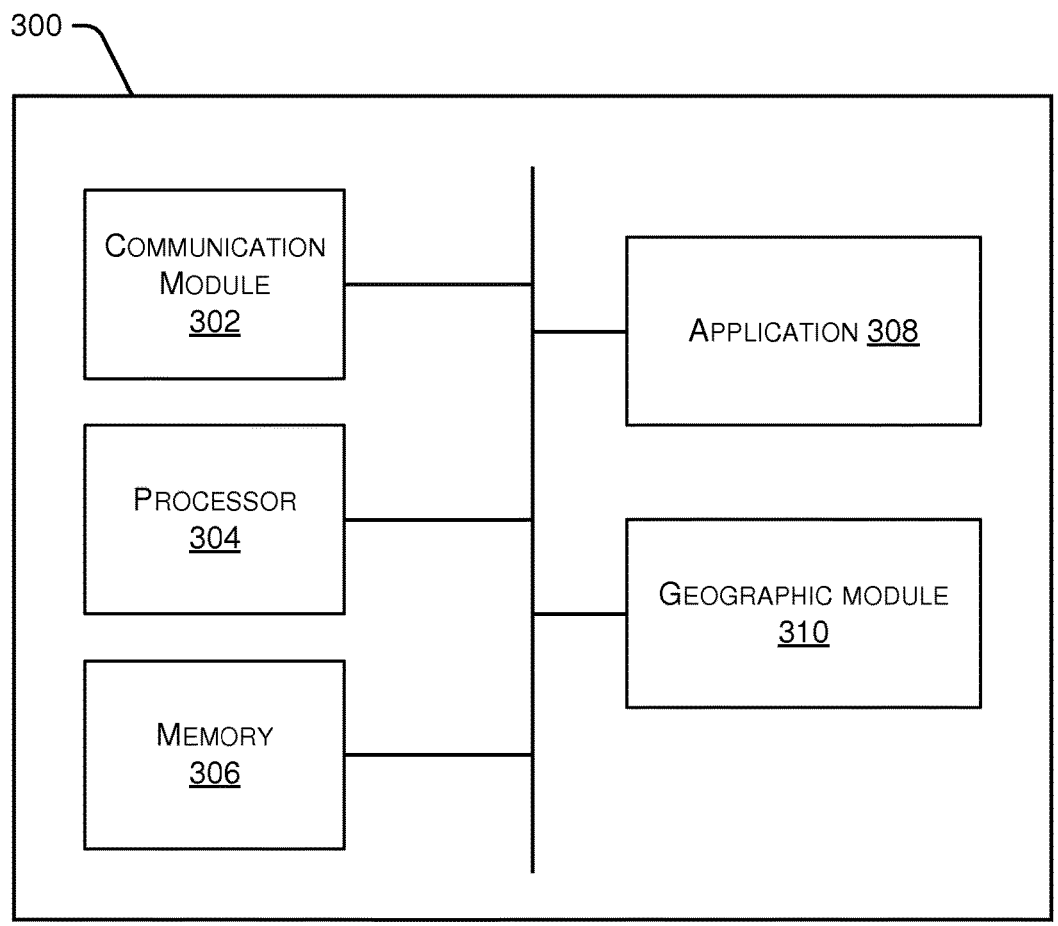
FIG. 3 is another block diagram depicting an embodiment of another computing device configured to implement systems and methods of the present disclosure.

FIG. 3 is a block diagram depicting an embodiment of a computing device 300 configured to implement systems and methods of the present disclosure. Computing device 300 (e.g., user device 108(1)) performs various functions related to collecting information and/or presenting items based on geographic information, as discussed herein. In some embodiments, computing devices 300 may be implemented as one or more computing devices that cooperatively implement the functions described herein. Computing device 300 may include a communication module 302, one or more processors (shown as a processor 304 in FIG. 2), and a memory 306.

Communication module 302 allows computing device 300 to communicate with other systems, such as communication networks, other servers, etc. Processor 304 executes one or more sets of instructions to implement the functionality provided by computing device 300. Memory 306 stores those instructions executable by processor 304 as well as other data used by processor 304 and other modules contained in computing device 300, such as an application 308, a geographic module 310, etc.

Computing device 300 may also include an application 308 which is configured to enable user 106(1) to make purchases, search, compare prices, read reviews and share products with other users (e.g., user 106(2)). For example, application 308 may allow user 106(1) to access an existing cart and wish-lists via a website and/or application maintained by and/or associated with service provider 102. In some embodiments, application 308 may receive recommendation 118 from server 104. In these instances, recommendation 118 may be determined based on geographic information 110 and circumstance parameter 114.

Computing device 300 may also include a geographic module 310 which is configured to obtain geographic information 110 associated with user 106(1). In some embodiments, geographic module 310 may be associated with a GPS receiver configured to access the GPS and determine geographic information 110 associated with user 106(1). For example, GPS receiver may determine and report geographic information 110 of user device 108(1) within a small radius.

Various other techniques may be used to determine geographic information 110 (e.g., absolute or relative position) of user 106(1) and/or user device 108(1). In some embodiments, geographic module 310 may determine geographic information 110 based on network IP addresses associated with user device 108(1). For example, geographic module 310 may compare the network IP address associated with the user device 108(1) with pre-compiled databases of IP networks and their geographic usage to deduce geographic information 110.

In some embodiments, geographic module 310 may identify wireless network access points or Wi-Fi "hotspots" that are nearby or to which they are connected, and use these points as references to locate user device 108(1). In some embodiments, geographic module 310 may determine geographic information 110 by identifying a particular cell tower or transceiver with which user device 108(1) communicates.

Figure 4:
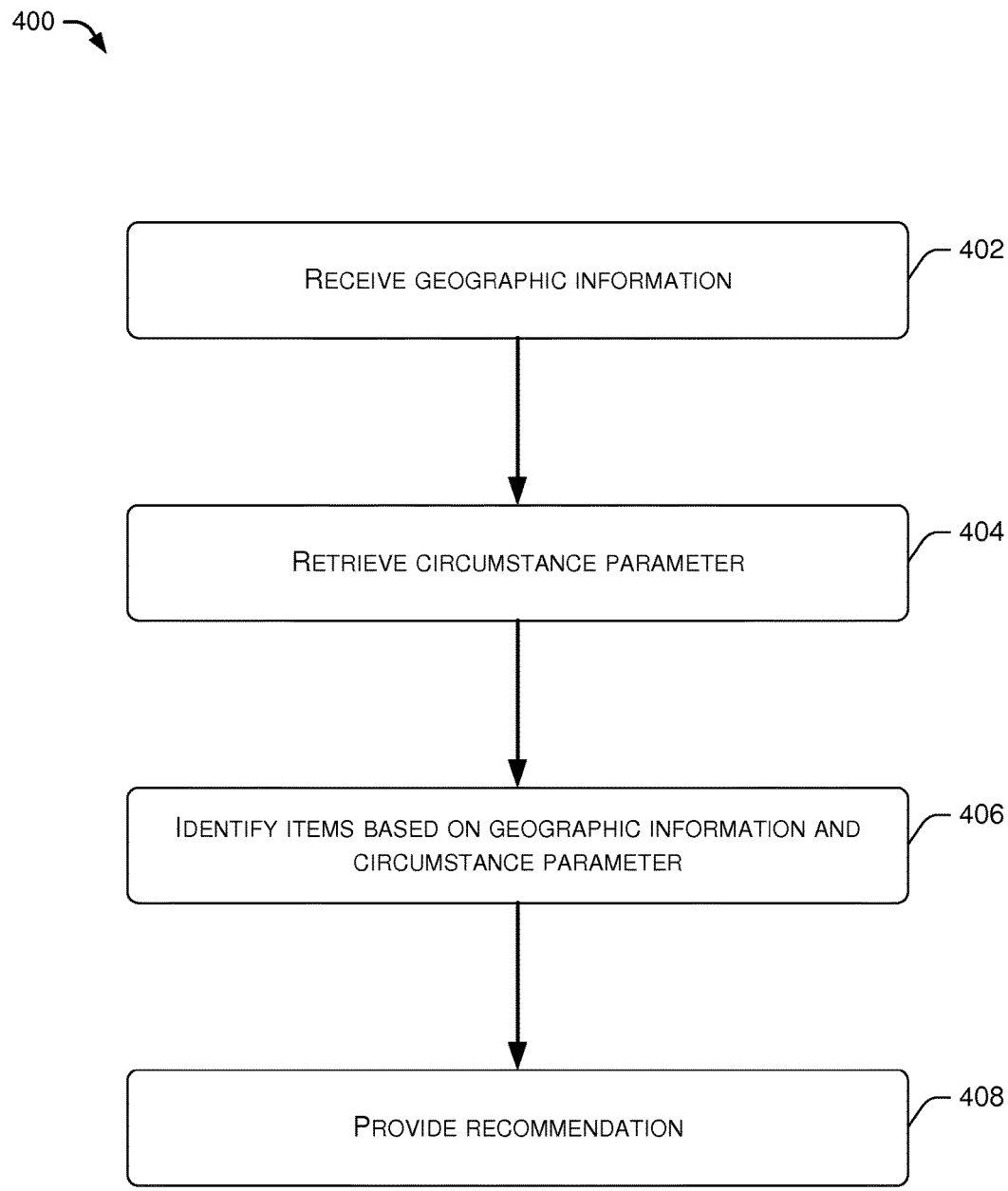
FIG. 4 is a flowchart diagram of an embodiment of a process for recommendation based on geographic location.

FIG. 4 is a flowchart diagram of an embodiment of a process 400 for recommendation based on geographic location. Example process 400 includes one or more operations, actions, or functions. Although illustrated as discrete blocks, various blocks may be divided into additional blocks, combined into fewer blocks, or eliminated, depending on the desired implementation. Process 400 may be implemented by one or more processors including, for example, the computing device 200. For illustrative purposes, the operations described below are performed by one or more processors of server 104 as shown in FIG. 1 and/or the processor 204 of the computing device 200 as shown in FIG. 2.

At 402, one or more processors of server 104 may receive geographic information 110 from user device 108(1). For example, geographic information 110 may indicate geographic location 112 of user 106(1). In some embodiments, geographic location 112 may be represented by GPS coordinates or a street address.

At 404, the one or more processors of server 104 may retrieve circumstance parameter 114 associated with geographic location 112 of user 106(1). Circumstance parameter 114 may include at least one of weather information associated with geographic location 112 in a predetermined period of time, a local social event associated with geographic location 112, a trending topic associated with geographic location 112, or activity information associated geographic location 112. The activity information may indicate an area for a certain activity, for example, shopping, reading, watching, driving, working, entertaining, etc. For example, the area may include physical stores, cinema, home, a scenic spot, etc.

At 406, the one or more processors of server 104 may identify one or more items based on geographic information 110 and circumstance parameter 114. In some embodiments, receiving module 202 may retrieve a user profile of an account of user 106(1). For example, the user profile may include user preference data associated with the one or more items. In these instances, recommendation module 206 may adjust a list of the one or more items based on the user preference data.

At 408, the one or more processors of server 104 may provide recommendation 118 of the one or more items for user 106(1). In some embodiments, geographic module 204 may analyze user activity history to generate a pattern of behavior associated with the user, and determine an additional user (e.g., user 106(2)) having a similar pattern of behavior within a predetermine period of time. In some instances, recommendation module 206 may also identify a particular item of the one or more items that is purchased by user 106(2), and increase a rank of the particular item in recommendation 118. The pattern of behavior may be determined based on a geographic behavior history of user 106(1). For example, user 106(1) is in/near Pac Bell Park on weekdays from 9:00 AM-5:00 PM as opposed to at Pac Bell Park in the evenings during the weekdays. Geographic module 204 may determine that the pattern of behavior associated with user 106(10 may be related to working versus having fan. In some embodiments, geographic module 204 may analyze the number of events/triggers of a specific location over days and/or times to rule out false pattern determination.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A computer-implemented method for recommending items, the method comprising:
   receiving, by one or more processors of a server, a signal from a mobile computing device associated with a user including a network IP address associated with the mobile computing device;
   comparing, by the one or more processors of the server, the network IP address, as received, associated with the mobile computing device with pre-compiled databases of IP networks and corresponding geographic usage to determine geographic information about the user, the geographic information indicating a geographic location of the user;
   accessing, by the one or more processors, a social media website and retrieving from the social media website a circumstance parameter associated with the geographic location of the user, the circumstance parameter comprising:
      a local social event associated with the geographic location; and
      activity information associated with the geographic information indicating a user activity of the user and associated with the geographic location;
   identifying, by the one or more processors, a plurality of items based at least in part on the geographic location and the circumstance parameter;
   retrieving, by the one or more processors, a user profile of an account of the user, the user profile comprising user preference data associated with the plurality of items and generating a list of recommended items from the plurality of items;
   generating, by the one or more processors, a ranked list of the list of recommended items based on the user preference data; and
   coordinating displaying, by the one or more processors, the ranked list of the list of recommended items on the mobile computing device.

2. The method of claim 1, further comprising:
   comparing, by the one or more processors of the server, the network IP address, as received, associated with the mobile computing device with the pre-compiled databases of IP networks and the corresponding geographic usage to determine the geographic information about the user, the geographic location of the mobile computing device within a radius is represented by global positioning system (GPS) coordinates or a street address.

3. The method of claim 1, wherein the circumstance parameter further comprises a frequency or duration of visits to the geographic location by the user.

4. The method of claim 1, wherein the circumstance parameter further comprises geographic relatedness indicating a relationship between the user and the geographic location.

5. The method of claim 1, wherein the activity information further comprises shopping, reading, driving, working, or entertaining.

6. The method of claim 1, further comprising:
   retrieving the circumstance parameter including a trending topic associated with the geographic location including accessing, by the one or more processors of the server, the social media website and selecting the trending topic based on an amount of instances of the trending topic in social media associated with the geographic location or an intensity rate of exchange of the trending topic in the social media associated with the geographic location.

7. The method of claim 1, wherein the circumstance parameter further comprises weather information associated with the geographic location in a predetermined period of time.

8. The method of claim 1, wherein:
   generating, by the one or more processors of the server, the ranked list of the list of recommended items further comprises:
      analyzing user activity history to generate a pattern of behavior associated with the user;
      determining an additional user having a similar pattern of behavior within a predetermined period of time;
      identifying a particular item of the plurality of items that is purchased by the additional user; and
      increasing a rank of the particular item in the list of recommended items.

9. One or more non-transitory computer-readable media storing computer-executable instructions that, when executed on one or more processors, cause the one or more processors to perform acts comprising:
   receiving, by the one or more processors of a server, a signal from a mobile computing device associated with a user including a network IP address associated with the mobile computing device;
   comparing, by the one or more processors, the network IP address, as received, associated with the mobile computing device with pre-compiled databases of IP networks and corresponding geographic usage to determine geographic information of the user, the geographic information indicating a geographic location of the user;
   accessing, by the one or more processors, a social media website and retrieving from the social media website a circumstance parameter associated with the geographic location of the user, the circumstance parameter comprising:
      a local social event associated with the geographic location; and
      activity information associated with the geographic information indicating a user activity of the user and associated with the geographic location;
   identifying, by the one or more processors, a plurality of items based at least in part on the geographic location and the circumstance parameter;
   retrieving, by the one or more processors, a user profile of an account of the user, the user profile comprising user preference data associated with the plurality of items and generating a list of recommended items from the plurality of items;

generating, by the one or more processors, a ranked list of the list of recommended items based on the user preference data; and coordinating displaying, by the one or more processors, the ranked list of the list of recommended items on the mobile computing device.

10. The one or more non-transitory computer-readable media of claim 9, wherein the circumstance parameter further comprises a frequency or duration of visits the geographic location by the user, and wherein the circumstance parameter further comprises geographic relatedness indicating a relationship between the user and the geographic location.

11. The one or more non-transitory computer-readable media of claim 9, wherein the activity information further comprises shopping, reading, driving, working, or entertaining.

12. The one or more non-transitory computer-readable media of claim 9, wherein the circumstance parameter further comprise a trending topic associated with the geographic location.

13. The one or more non-transitory computer-readable media of claim 12, wherein the acts further comprise:
  selecting the trending topic based on an amount of instances of the trending topic in social media associated with the geographic location or an intensity rate of exchange of the trending topic in the social media associated with the geographic location.

14. The one or more non-transitory computer-readable media of claim 9, wherein the circumstance parameter further comprises weather information associated with the geographic location in a predetermined period of time.

15. The one or more non-transitory computer-readable media of claim 9, wherein generating, by the one or more processors of the server, the ranked list of the list of recommended items further comprises:
  analyzing user activity history to generate a pattern of geographic behavior associated with the user;
  determining an additional user having a similar pattern of geographic behavior within a predetermined period of time;
  identifying a particular item of the plurality of items that is purchased by the additional user; and
  increasing a rank of the particular item in the list of recommended items.

16. An apparatus comprising:
  a memory configured to store data and one or more sets of instructions; and
  one or more processors coupled to the memory, the one or more processors configured to execute the one or more sets of instructions and perform operations comprising:
    receiving a signal from a mobile computing device associated with a user including a network IP address associated with the mobile computing device;
    comparing the network IP address, as received, associated with the mobile computing device with precompiled databases of IP networks and corresponding geographic usage to determine geographic information of the user, the geographic information indicating a geographic location of the user;
    accessing a social media website and retrieving from the social media website a circumstance parameter associated with the geographic location of the user, the circumstance parameter comprising:
      a local social event associated with the geographic location; and
      activity information associated with the geographic information indicating a user activity of the user and associated with the geographic location;
    identifying a plurality of items based at least in part on the geographic location and the circumstance parameter;
    retrieving, by the one or more processors, a user profile of an account of the user, the user profile comprising user preference data associated with the plurality of items and generating a list of recommended items from the plurality of items;
    generating, by the one or more processors, a ranked list of the list of recommended items based on the user preference data; and
    coordinating displaying the ranked list of the list of recommended items on the mobile computing device.

17. The apparatus of claim 16, wherein the circumstance parameter further comprises a frequency or duration of visits the geographic location by the user, and wherein the circumstance parameter further comprises geographic relatedness indicating a relationship between the user and the geographic location.

18. The apparatus of claim 16, wherein the circumstance parameter further comprises a trending topic associated with the geographic location.

19. The apparatus of claim 18, wherein the operations further comprise:
  selecting the trending topic based on an amount of instances of the trending topic in social media associated with the geographic location or an intensity rate of exchange of the trending topic within the social media associated with the geographic location.

20. The apparatus of claim 16, wherein generating, by the one or more processors, the ranked list of the list of recommended items further comprising:
  analyzing user activity history to generate a pattern of behavior associated with the user;
  determining an additional user having a similar pattern of behavior within a predetermined period of time;
  identifying a particular item of the plurality of items that is purchased by the additional user; and
  increasing a rank of the particular item in the list of recommended items.

* * * * *